US007483538B2

(12) United States Patent
McCarty et al.

(10) Patent No.: US 7,483,538 B2

(45) Date of Patent: Jan. 27, 2009

(54) WIRELESS AND WIRED SPEAKER HUB FOR A HOME THEATER SYSTEM

(75) Inventors: William A. McCarty, San Diego, CA (US); Jeff King, Jr., San Diego, CA (US)

(73) Assignee: KSC Industries, Inc., Chula Vista, CA (US)

(*) Notice: Subject to any disclaimer, the term of this patent is extended or adjusted under 35 U.S.C. 154(b) by 739 days.

(21) Appl. No.: 10/792,652

(22) Filed: Mar. 2, 2004

(65) Prior Publication Data

US 2005/0195986 A1 Sep. 8, 2005

(51) Int. Cl.
*H04B 3/00* (2006.01)
*H04R 27/00* (2006.01)

(52) U.S. Cl. .......................... 381/77; 381/78; 381/80; 381/81; 381/84; 381/85

(58) Field of Classification Search .................. 381/79, 381/311, 334, 77, 80, 81, 85, 84, 78
See application file for complete search history.

(56) References Cited

U.S. PATENT DOCUMENTS 6,233,002 B1 * 5/2001 Shibayama .............. 348/14.05
6,608,907 B1 8/2003 Lee
2004/0223622 A1 * 11/2004 Lindemann et al. ........... 381/79

* cited by examiner

*Primary Examiner*—Vivian Chin
*Assistant Examiner*—George C Monikang
(74) *Attorney, Agent, or Firm*—Knobbe Martens Olson & Bear LLP

(57) ABSTRACT

A method and system for communicating audio, video, and/or control signals within a home entertainment system. A plurality of audio channels is communicated between a wireless transmitter and a wireless receiver. The wireless transmitter is located proximate to a speaker housing. In some embodiments the speaker housing also encloses a center channel loudspeaker. The center channel loudspeaker transmits an audio signal to a remote loudspeaker. An exemplary remote loudspeaker is a subwoofer loudspeaker. The subwoofer loudspeaker provides one or more received audio channels to one or more surround loudspeakers.

33 Claims, 16 Drawing Sheets

TX

WIRELESS AND WIRED SPEAKER HUB FOR A HOME THEATER SYSTEM

BACKGROUND OF THE INVENTION

1. Field of the Invention

This invention relates to signal routing networks. More particularly, the invention provides a method and system for distributing one or more signals, via a wired and wireless medium, for a home theater system.

2. Description of Related Art

Modern home theater systems immerse viewers by displaying a video signal on a video display while routing a related audio signal to one or more loudspeakers. The audio signal may include audio channels, for multiple loudspeakers, that are to be heard emanating from different locations around the viewers. Speaker wires are commonly employed to route the audio channels to the different loudspeaker locations. Depending on the locations of the loudspeakers and their distance from the audio source, routing of the speaker wires presents a challenge to the viewer. Difficulties can also arise when retrofitting a multi channel loudspeaker system into an existing entertainment room. Moreover, as the audio signals contain more and more channels, with each channel corresponding to a prescribed location around the viewer, the routing of speaker wires becomes even more daunting.

U.S. Pat. No. 6,608,907 to Lee discloses an audio output apparatus having wireless speakers. The audio output apparatus outputs an audio signal for a 5.1 channel system. The audio signal is encoded in accordance with an IEEE 1394 protocol. The encoded audio signal is provided to a subwoofer loudspeaker through an IEEE 1394 communication line. The audio signal is decoded in the sub-woofer loudspeaker and then modulated by a spread spectrum FM modulation method. The modulated signal is then transmitted to wirelessly connected speakers. The described surround speaker system does away with the routing of unsightly speaker wires throughout a listening area. However, such a design has other significant drawbacks.

The wirelessly connected speakers are specialized speakers in that they must contain means to receive the wireless signals as well as means to amplify the received signals. For example, the wirelessly connected speakers each include an amplifier to amplify the received signal. A listener, who is retrofitting the speaker system described in Lee into their listening area, must purchase specialized speakers that include these components. These specialized speakers may be manufactured by only a few manufactures and have a limited selection. Thus, besides the added cost of purchasing new specialized speakers, the limited availability may not allow a listener to select speakers from a manufacture that the listener prefers. Another aspect is the added cost to the consumer of having multiple amplifiers and power supplies in multiple locations.

Furthermore, to amplify the received signals, the speakers/amplifiers must be plugged into a wall outlet to receive power or use batteries, which is inconvenient. However, a wall outlet may not be conveniently located at the locations of each speaker. To provide power to each speaker, the listener may end up routing unsightly power cords around the listening area. Thus, the desire to free the listening area of unsightly wires may still not be achieved with the speaker system described in Lee.

SUMMARY OF THE INVENTION

The systems and methods of the present invention have several features, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the features of this invention provide several advantages over traditional home theater systems.

One aspect of the invention relates to a home entertainment system that comprises a speaker housing having a loudspeaker, wherein the loudspeaker is configured to broadcast a first channel of an audio signal and a transmitter located proximate to the speaker in a first selected area of a room and configured to wirelessly transmit a plurality of channels of the audio signal, wherein the plurality of channels is different than the first channel. The home entertainment system further comprises a receiver located remote from the transmitter in a second selected area of the room, wherein the receiver is configured to wirelessly receive the plurality of channels and a second speaker housing located proximate to the receiver and having a second loudspeaker and an amplifier, wherein the amplifier is configured to amplify at least two of the received channels, and wherein the second loudspeaker is configured to broadcast one of the amplified channels and route the other amplified channel to a third speaker housing.

Another aspect of the invention is a housing that comprises a wireless receiver configured to receive a plurality of channels and an amplifier configured to amplify at least three of the plurality of received channels. The housing further comprises a loudspeaker configured to broadcast one of the at least three amplified channels and output at least two of the at least three amplified channels.

Still another aspect of the invention is a method of distributing audio channels in a surround sound system having a plurality of distinct audio channels. The method comprising wirelessly transmitting at least two of the audio channels from a transmitter located proximate to a first speaker to a wireless receiver located proximate to a second speaker and amplifying the wirelessly transmitted channels with amplifier circuitry located proximate to the second speaker. The method further comprises routing a first one of the amplified audio channels to the second speaker using a wired connection and routing a second one of the amplified audio channels to a third speaker using a wired connection.

Yet another aspect of the invention is an entertainment system configured to receive an audio signal from an input device and provide the audio signal to a plurality of remote loudspeaker. The entertainment system comprises a center channel loudspeaker comprising a transmitter module configured to receive an audio signal and transmit the audio signal to a remote loudspeaker, wherein the audio signal includes a plurality of different channels and a remote loudspeaker having a receiver configured to receive the audio signal and distribute at least one of the received audio channels to a surround loudspeaker.

Another aspect of the invention is a method for routing an audio signal in a home theater system. The method comprises receiving a first audio signal which comprises a plurality of audio channels, amplifying one of the plurality of audio channels, and transmitting a second audio signal which comprises at least two audio channels from the plurality of audio channels. The method further comprises amplifying one of the transmitted audio channels and providing the amplified audio channel to a surround loudspeaker via a wired connection.

An additional aspect of the invention is a multi-room entertainment system that comprises a transmitter located in a first room and configured to wirelessly transmit a plurality of channels of an audio signal, a receiver located in a second room, wherein the receiver is configured to wirelessly receive the plurality of channels, and a speaker housing located proximate to the receiver and having a loudspeaker and an amplifier, wherein the amplifier is configured to amplify at least two of the received channels, and wherein the loudspeaker is configured to broadcast one of the amplified channels and route the other amplified channel to a second loudspeaker housing.

DETAILED DESCRIPTION OF THE PREFERRED EMBODIMENTS

Preferred embodiments of the present invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific preferred embodiments of the present invention.

Figure 1A:
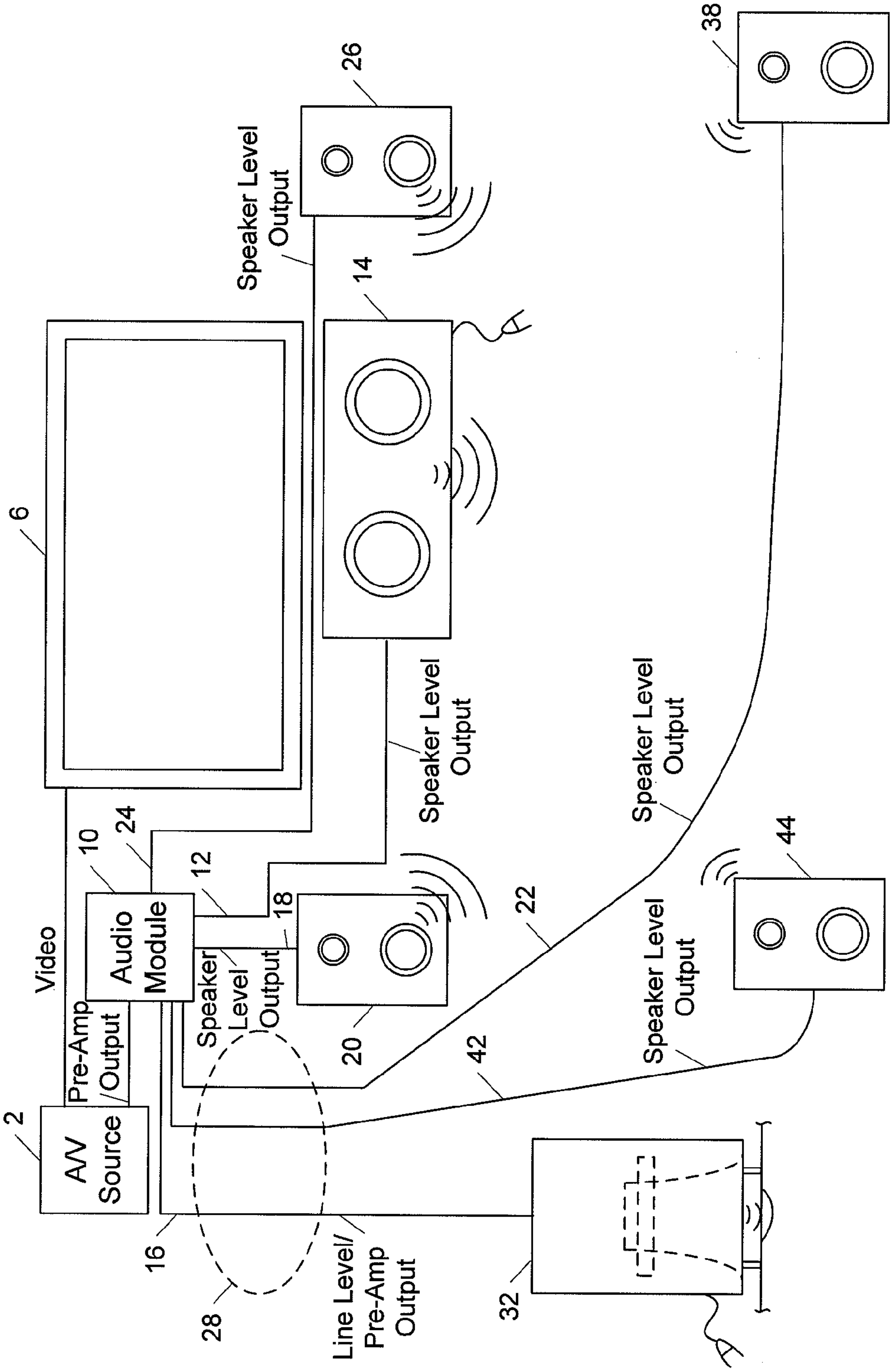
Prior Art FIG. 1A
FIG. 1A is a block diagram of a prior art home theater system that distributes an audio signal to rear-right and rear-left loudspeakers located at the rear of the listening area using speaker wires.

FIG. 1A is a block diagram of a prior art home theater system that distributes an audio signal to multiple speakers located around the listening area. The home theater system depicted in this figure is in a surround sound application that includes six different speakers. The home theater system includes a front-left loudspeaker 20, a front-right loudspeaker 26, a center channel loudspeaker 14, a rear-left loudspeaker 44, a rear-right loudspeaker 38, and a subwoofer loudspeaker 32. The system distributes an audio signal to the front-right, the front-left, and the center channel loudspeakers 20, 26, 14 which are located at the front of the listening area using speaker wires 18, 24, 12 respectively. The system distributes an audio signal to rear-right, rear-left, and subwoofer loudspeakers 38, 44, 32 which are located at the rear of the listening area using speaker wires 22, 42, 16 respectively. Thus, some of the speakers are located at the front of the listening area while others are located at the rear of the listening area. Each speaker must be connected to a receiver/audio module 10 via speaker wires.

The rear-left loudspeaker 44, the rear-right loudspeaker 38, and the subwoofer loudspeaker 32 are typically located near the back of the listening area and behind the listener. To connect with these three speakers, the listener runs speaker wires 28 between the front and back of the listening area. The routing of speaker wires across the listening area can be unsightly and is a disadvantage of such home theater systems.

To enjoy the home theater system, a listener inserts a movie or other audio/video work into a digital video disk player 2. For example, the movie can be stored on a digital video disk (DVD). The digital video disk player 2 reads an audio signal and a video signal stored on the DVD. The DVD player 2 includes audio outputs and video outputs for providing the audio and video signals read from the DVD to the home theater system. For example, the video outputs on the DVD player 2 can be composite, SVHS, DVI, component or other connectors. In the home theater system in FIG. 1, the listener views a television 6 upon which the DVD video signal is displayed.

The audio outputs on the DVD player 2 can be configured to output the audio signal in digital or analog form. An analog signal may be output from the DVD player 2 via a plurality of connectors. Each connector outputs one of the channels in the audio signal. For a six channel audio signal, the DVD player 2 would have multiple connectors. A digital signal may be output from the DVD player 2 via a single optical or coaxial connector. In this case, the audio signal output from the single digital connector includes all of the audio channels.

Figure 1B:
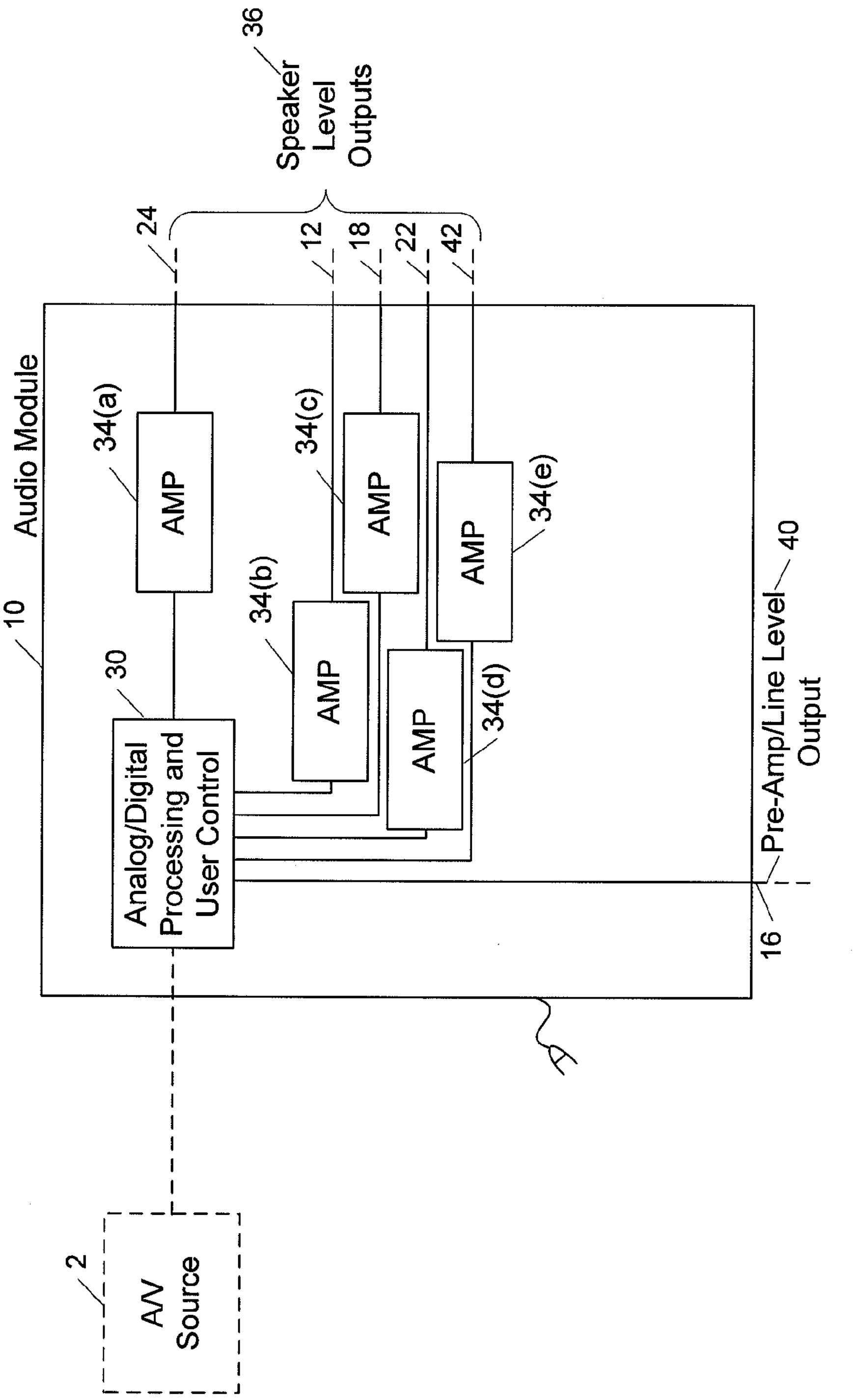
Prior Art FIG. 1B
FIG. 1B is a block diagram of the audio module shown in FIG. 1A, which amplifies the audio signal distributed to the rear-right and rear-left loudspeakers.

FIG. 1B is a block diagram of an audio module 10 shown in FIG. 1A, which amplifies portions of the audio signal received from the DVD player 2 and provides the amplified portions to the full frequency loudspeakers in the home theater system. Due to the high power requirements to reproduce low frequency effects as compared to reproducing full frequency effects, amplification of the subwoofer channel is typically performed separately from amplification of the full frequency channels. The audio/video receiver or audio module 10 receives the audio signal from the DVD player 2. The A/V receiver 10 can include analog and digital input connectors which are configured to receive the audio signal from the DVD player 2. For example, if the audio signal is output from the DVD player 2 via analog connectors, the audio/video receiver includes analog connectors. If the audio signal is output from the DVD player 2 via a digital connector, the audio/video receiver includes a digital connector.

The A/V receiver 10 can include a sound processor 30 and amplifiers 34(*a*)-(*e*). The sound processor receives the audio signal from the DVD player 2. From the audio signal, the surround processor outputs individual signals for the channels in the home theater systems. These signals may or may not be amplified by the A/V receiver 10. Typically, the A/V receiver 10 amplifies the full frequency effect channels. These amplified signals are output from the A/V receiver 10 as speaker level signals 36. These speaker level signals drive the loudspeakers 14, 20, 26, 38, 44. A low frequency effects (LFE) channel is typically not amplified by the A/V receiver 10. The low frequency effect channel is output from the A/V receiver 10 as a line level or pre-amp signal 40. The line level signal 40 is provided to the subwoofer loudspeaker 32. The line level signal requires amplification by a separate amplifier associated with the subwoofer loudspeaker 32.

DVDs may employ different audio signal formats. The receiver 10 may select from one or more surround sound formats for the audio signal associated with a selected DVD. The one or more surround sound formats may have a different number of channels or the same number of channels. DVD audio signals can include, for example, Dolby digital and/or DTS digital signals. A DVD encoded with a 5.1 channel configuration may employ, for example, a dolby digital format or a DTS format. As explained below, dolby digital as well as DTS each may include discrete channels or a combination of discrete and virtual channels.

Dolby digital 5.1 is a surround sound format which provides up to five discrete (independent) channels (center channel, front left, front right, rear left, rear right; giving it the “5” designation) of full frequency effects (for example, from 20 Hz to 20,000 Hz). The center channel loudspeaker 14 is normally placed at the front center of the audio listening area. The center channel loudspeaker 14 is often aligned with a vertical axis that passes through the center of the display device 6. In this way, the center channel is preferably located above or below the display device 6. The left and right front loudspeakers 20, 26 are placed on both sides of the center channel loudspeaker 14. The rear left and rear right loudspeakers 44, 38 are placed on respective sides of the audio listening area. Thus, five discrete loudspeakers are located around the audio listening area for reproducing five discrete channels.

A dolby digital 5.1 signal further includes an optional sixth channel dedicated for low frequency effects (LFE). The subwoofer loudspeaker 32 is specifically designed to reproduce LFE. The LFE channel gives dolby digital the “0.1” designation. The “0.1” signifies that the sixth channel is not full frequency, as it contains only deep bass frequencies (for example, 20 Hz to 120 Hz). Many DVD titles come with a dolby digital 5.1 audio signal. Other variants of dolby digital include mono (dolby digital 1.0), two channel dolby digital (stereo or dolby digital 2.0), and five channels of audio (dolby digital). DTS Digital Surround (a.k.a. DTS) is another 5.1 channel configuration format.

While not illustrated in FIGS. 1A and 1B, the sound processor module 30 may output a hybrid 5.1 channel configuration format. Hybrid 5.1 channel configurations include, for example, THX Surround EX (a.k.a. dolby digital EX) and DTS Extended Surround (DTS-ES). THX Surround EX is the extended surround version of dolby digital 5.1, while DTS-ES is the extended surround version of DTS 5.1. These hybrid 5.1 channel configurations differ from their true 5.1 counterparts in that the hybrids derive or create a sixth full frequency channel or surround back channel from the existing channels. THX Surround EX and DTS-ES create the surround back channel from the rear left and rear right channels 44, 38. Thus, the surround back channel is not a true discrete channel. This surround back channel is properly located behind the audio listening area.

Unlike the format described above, DTS-ES discrete 6.1 is a true 6.1 channel format. DTS-ES 6.1 supports a discrete surround back channel. Thus, the DSP module would decode a surround back channel from a discrete data stream that is independent from those of the rear left and rear right channels 44, 38. This surround back channel may be utilized with two surround back channel loudspeakers. Each back channel loudspeaker can be spaced symmetrically behind the audio listening area. Since DTS-ES 6.1 only provides six discrete full frequency channels and one LFE channel, an audio listening area employing two surround back channels loudspeakers has a hybrid 6.1 channel configuration.

The A/V receiver 10 can perform signal level conditioning which includes, for example, graphic equalization, balance adjustment, fader adjustment, and volume adjustment to the audio signal. The listener may adjust dials/buttons/slides on the A/V receiver 2 and remote control for the A/V receiver 10 to affect signal level conditioning.

The A/V receiver 10 provides the audio channels to the front-left loudspeaker 20, the front-right loudspeaker 26, the center channel loudspeaker 14, the rear-right loudspeaker 38, the rear-left loudspeaker 44, and the subwoofer loudspeaker 32. The front-left loudspeaker 20 receives the front-right audio channel via speaker wire 18. The front-right loudspeaker 26 receives the front-right audio channel via speaker wire 24. The center channel loudspeaker 14 receives the center channel via speaker wire 12. The subwoofer loudspeaker 32 receives the subwoofer channel via speaker wire 16. The A/V receiver 10 drives the rear-right loudspeaker 38 and the rear-left loudspeaker 44 via speaker wires 36, 42, respectively. However, the listener is required to run unsightly speaker wires 28 from the A/V receiver 10 to the subwoofer, rear-right, rear-left loudspeakers 32, 38, 44.

Figure 1C:
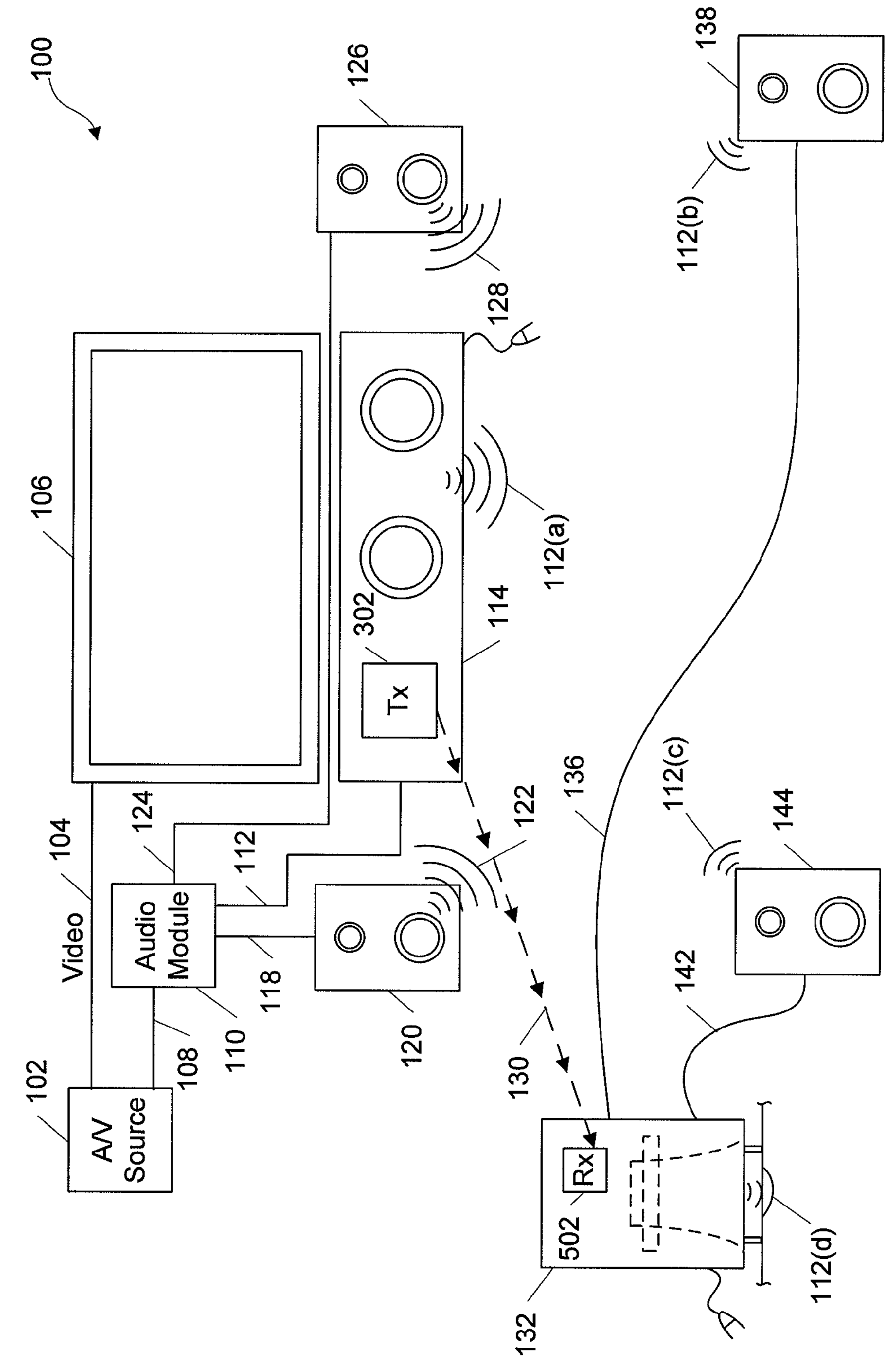
FIG. 1C is a block diagram of a home theater system which includes a center channel loudspeaker which wirelessly transmits a plurality of channels to a subwoofer loudspeaker.

In contrast to FIGS. 1A and 1B, FIG. 1C is a block diagram of a home theater system 100 which wirelessly transmits the rear-left, rear-right, and subwoofer audio channels to a receiver located proximate to the subwoofer loudspeaker 132. The rear-left and rear-right loudspeakers 144, 138 do not receive wireless signals. The subwoofer loudspeaker amplifies the rear-left and rear-right channels. Thus, the rear-left and rear-right loudspeakers are not specialized loudspeakers. The rear-left and rear-right loudspeakers need not incorporate amplifiers and their associated power cords. Moreover, the rear-right and rear-left loudspeakers need not incorporate wireless components. By only employing a wireless technique to receive the audio channels at the subwoofer loudspeaker 132, the home entertainment system 100 allows the listener to use non-specialized, rear-right and rear-left loudspeakers while still preserving the primary advantage of prior art wireless speaker systems of not running speaker wires between the front and back of the listening area. As illustrated in FIG. 1C, speaker wires do not cross the center of the listening area.

Figure 9:
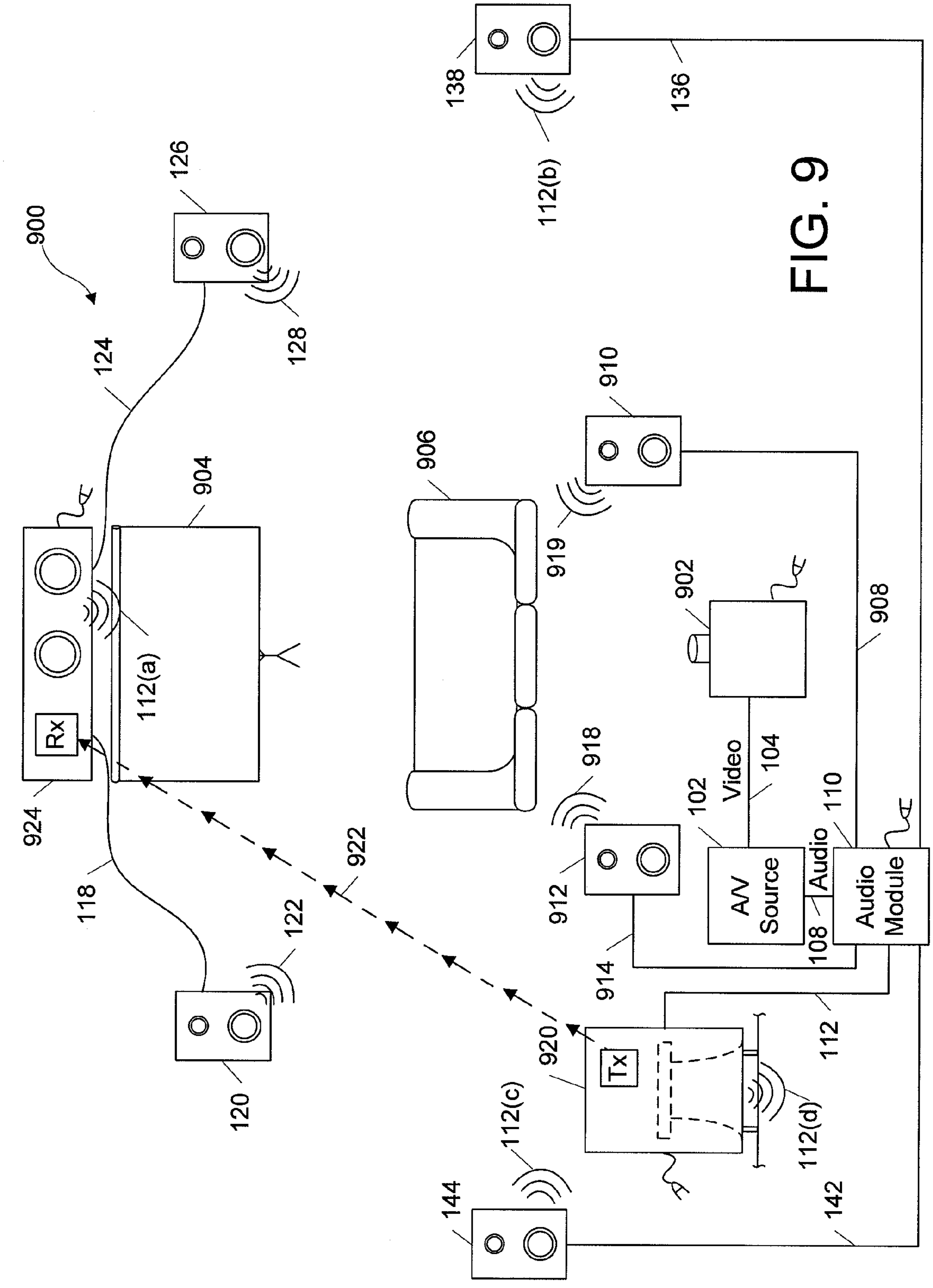
FIG. 9 is a third embodiment of a home theater system which includes a subwoofer loudspeaker that wirelessly transmits a plurality of channels to a center channel loudspeaker.

The home theater system 100 depicted in this figure is in a surround sound application where a listener is viewing a television 106 upon which a motion picture or other program is displayed and where the listener desires surround sound effects. Depending on the locations of the home theater system components, the receiver which receives the wireless signal can be located proximate to a subwoofer loudspeaker 132 (FIG. 1C) or a center channel loudspeaker 924 (FIG. 9). More importantly, the wireless receiver is located at the opposite end of the listening area away from the A/V receiver/audio module 110. In FIG. 1C, the wireless receiver is located proximate to the subwoofer loudspeaker 132 which itself is located at the opposite end of the listening area away from the audio module 110. In FIG. 9, the wireless receiver is located proximate to the center channel loudspeaker 924 which itself is located at the opposite end of the listening area away from the audio module 110. Additional features of a home theater system are described in U.S. Pat. Ser. No. 10/613,596, filed Jul. 3, 2003, and U.S. patent express mail number EV370472535US, filed Feb. 20, 2004, both being titled Wired, Wireless, Infrared, and Powerline Audio Entertainment Systems and both hereby incorporated by reference in their entireties.

The wireless receiver 502 receives the transmitted audio channels which, in turn, are used to drive a rear-left loudspeaker 144, a subwoofer 132 and a rear-right loudspeaker 138. While the wireless receiver 502 is preferably located near the sub-woofer loudspeaker 132, various arrangements of the wireless receiver 502 with respect to the sub-woofer loudspeaker 132 are within the scope of the invention. In one embodiment that is illustrated in FIG. 1C, the wireless receiver 502 is located in the same housing as the sub-woofer loudspeaker 132. In such an embodiment, the wireless receiver 502 and the subwoofer loudspeaker 132 share a common housing. In another embodiment, the wireless receiver 502 and the subwoofer loudspeaker 132 still share a common housing, however, the wireless receiver 502 and the subwoofer loudspeaker 132 are separated within the housing by a partition or other separation means. These means may include a grate, foam, wood, plastic, particleboard, and other porous or non-porous materials. With the wireless receiver 502 partitioned from the subwoofer loudspeaker 132, acoustical interference caused by sound waves reflecting from the wireless receiver 502 may be reduced.

In another embodiment, the wireless receiver 502 has a separate housing from the housing for the sub-woofer loudspeaker 132. In this embodiment, the housing for the wireless receiver 502 is placed adjacent to or near the housing for the sub-woofer loudspeaker 132. By employing separate housings, the listener's flexibility when locating the wireless receiver 502 and the subwoofer loudspeaker 132 within the listening area may be enhanced. For example, the listener may locate the wireless receiver 502 on the top, bottom, or side of the subwoofer loudspeaker housing depending on the available space between the subwoofer loudspeaker housing and adjacent furniture. Additionally, this flexibility may be advantageous to the listener when a clear line of sight between the wireless transmitter and the wireless receiver improves the quality of the received wireless signal. For embodiments where the wireless receiver 502 is placed near or adjacent to the sub-woofer loudspeaker 132, the wireless receiver 502 and subwoofer loudspeaker 132 are connected so that the wireless receiver 502 can provide the subwoofer audio channel as well as additional audio channels to the subwoofer loudspeaker 132. Continuing with this embodiment, the audio channels destined for the rear-left and rear-right loudspeakers 144, 138 may be amplified by the subwoofer loudspeaker 132 (FIG. 1C) or amplified separately from the subwoofer 132. For example, an additional two-channel amplifier could be employed to receive the rear-left and rear-right channels from the wireless receiver 502 and amplify the received channels to drive the rear-left and rear-right loudspeakers 144, 138.

The home theater system 100 further drives a front-left loudspeaker 120, a front-right loudspeaker 126, and a center channel loudspeaker 114 to thereby broadcast the appropriate sounds required to create the desired sound effect. However, unlike the rear-right, rear-left, and subwoofer loudspeakers, the front-left, front-right, and center channel loudspeakers are wired to the audio module 110 via speaker wires 118, 124, 112.

In this way, the home theater system 100 transmits wireless audio channels to the receiver 502 located proximate to the subwoofer loudspeaker 132 that, in turn, are used to drive at least one additional loudspeaker. In FIG. 1C, the subwoofer loudspeaker 132 drives the rear-left and rear-right loudspeakers 144, 138. As will be described in further detail herein below, the audio module 110 can perform signal level conditioning wherein graphic equalization, balance adjustment, fader adjustment, volume adjustment and other control signals are applied to the signal wirelessly broadcast to the subwoofer loudspeaker 132.

Still referring to FIG. 1C, the home theater system 100 receives an input signal from an input device 102. Types of input signals can include, for example, an audio signal 108 and video signal 104. These signals can originate from one or more input devices 102 depending on the type of input signal. For ease of explanation, the following description uses a combined audio/video signal as an exemplary input signal to the home theater system 100. Examples of input devices 102 that generate a combined audio/video signal include a video-cassette recorder (VCR), laserdisc player, camcorder, digital video disk (DVD) player, satellite receiver, cable box, and the like. The DVD player can be a stand-alone device, combined with the VCR, or incorporated into a personal computer. The input device 102 may select from one or more surround sound formats for the audio signal 108 associated with a selected DVD. The one or more surround sound formats may each have a different number of channels or the same number of channels. DVD audio signals can include, for example, dolby digital and/or DTS digital signals.

The home theater system 100 can be used with an input device 102 that provides a multi-channel audio signal without an associated video signal. This in contrast to the input devices 102 described above which provide both an audio and a video signal. Examples of input devices 102 that can generate an audio signal include a personal computer, digital video disk (DVD) player, a stereo receiver, MP3 player, compact disk (CD) player, digital audio tape (DAT), and the like. An exemplary format for a six channel audio signal is Super Audio CD (SACD).

Each home entertainment system 100 can further comprise a TV, video display, or other display device 106 for displaying the video signal 104. The display device 106 can be connected directly to the input device 102 as illustrated in FIG. 1C, or indirectly to the input device 102 via the audio module 110 or the center channel loudspeaker 114. Since the center channel loudspeaker 114 is advantageously located near the display device 106, ease of installation is enhanced by routing the video signal together with one or more audio signals to the center channel loudspeaker 114. However, as explained above, the invention is not limited to the video signal routing illustrated in FIG. 1C.

The home theater system 100 routes the audio signal 108 associated with the video signal 104 to an audio module 110. An exemplary audio module 110 is an audio/video receiver. The audio module 110 can include sound processing logic which identifies the audio channels in the audio signal 108. Depending on the audio channel format(s) available from the input source 102, the audio module 110 processes the audio signal 108 into the selected channel configuration. Exemplary channel configurations include Dolby Digital, DTS, SRS and others. These channel configurations may include, for example, stereo, 2.1, 3.1, 5.1, 6.1, 7.1 and the like. The audio module 110 may further process control information such as equalizer information, volume or other signal processing information input by the listener. The listener may input the control information to the A/V receiver 110. The control information may be associated with one or more of the audio channels. The control information that is associated with rear-left, rear-right, and subwoofer loudspeakers is transmitted along with the audio channels to the subwoofer loudspeaker 132. The audio module 110 is described in detail with reference to FIG. 2.

The audio module 110 provides speaker level audio signals to the front-left loudspeaker 120, the front-right loudspeaker 126, and the center channel loudspeaker 114. The front-left loudspeaker 120 receives the front-left audio channel via line 118 and broadcasts the signal 122. The front-right loudspeaker 126 receives the front-right audio channel via line 124 and broadcasts the signal 128. The center channel loudspeaker 114 receives the center channel audio channel via line 112 and broadcasts the signal 112(*a*). Unlike the front-left and front-right loudspeakers, the center channel loudspeaker 114 also receives line level audio signals destined for the subwoofer loudspeaker 132, the rear-right loudspeaker 138, and the rear-left loudspeaker 144 via line 112. In the home theater system 100 illustrated in FIG. 1C, the center channel loudspeaker 114 is configured to wirelessly transmit the audio channels destined for the subwoofer loudspeaker 132, the rear-right loudspeaker 138, and the rear-left loudspeaker 144 to the receiver located proximate to the subwoofer loudspeaker 132.

A wireless transmitter 302 receives the line level audio signals from the audio module 110 that are destined for the subwoofer, rear-left, and rear-right loudspeakers 132, 144, 138. While the wireless transmitter 302 is preferably located near the center channel loudspeaker 114, various arrangements of the wireless transmitter 302 with respect to the center channel loudspeaker 114 are within the scope of the invention. In one embodiment that is illustrated in FIG. 1C, the wireless transmitter 302 is located in the same housing as the center channel loudspeaker 114. In such an embodiment, the wireless transmitter 302 and the center channel loudspeaker 114 share a common housing. In another embodiment, the wireless transmitter 302 and the center channel loudspeaker 114 still share a common housing, however, the wireless transmitter 302 and the center channel loudspeaker 114 are separated within the housing by a partition or other separation means. These means may include a grate, foam, wood, plastic, particleboard, and other porous or non-porous materials. With the wireless transmitter 302 partitioned from the center channel loudspeaker 114, acoustical interference caused by sound waves reflecting from the wireless transmitter 302 may be reduced.

In another embodiment, the wireless transmitter 302 has a separate housing from the housing for the center channel loudspeaker 114. By employing separate housings, the listener's flexibility when locating the wireless transmitter 302 and the center channel loudspeaker 114 within the listening area may be enhanced. Additionally, this flexibility may be advantageous to the listener when a clear line of sight between the wireless transmitter and the wireless receiver improves the quality of the received wireless signal. For embodiments where the wireless transmitter 302 is not located within the center channel loudspeaker 114, the wireless transmitter 302 is advantageously placed near the audio module 110 so that the wireless transmitter 302 can receive the audio channels from the audio module 110 without employing wires, which cross the listening area. The wireless transmitter 302, whether housed in a loudspeaker, standalone enclosure or other mounting technique, can derive its power from an ac adapter or the amplified or audio input signals. Advantageously, embodiments where the wireless transmitter 302 is powered by the amplified or audio input signals may be located away from an ac receptacle and not require power supply or AC cord.

The wireless transmitter 302 may further process control information received from the audio module 110. The wireless transmitter 302 transmits to the receiver 502 located proximate to the subwoofer loudspeaker 132 along wireless path 130. The transmitted signal can include audio channels destined for the subwoofer, the rear-right, and the rear-left loudspeakers along with any control information that is associated with the transmitted audio channels. Together, the audio channels and any control information can form a combined signal.

In the embodiment illustrated in FIG. 1C, the transmitter 302 employs a wireless protocol to transmit the combined signal to the wireless receiver 502. For example, the transmitter 302 could transmit the combined signal via radio frequency (RF), IR, powerline or other wireless technique to the wireless receiver 502. The illustrated embodiment of the home theater system 100 is configured to utilize a radio frequency (RF) transmission protocol. The following description equally applies to home theater systems 100 that use techniques besides RF. By wirelessly transmitting the audio signal between the front and back of the listening area, the listener is not required to run speaker wires between the audio module 110 and the rear-left, rear-right, and subwoofer loudspeakers 144, 138, 132.

The wireless receiver 502 receives the transmitted audio channels and any control information transmitted along path 130. The wireless receiver 502 provides the received subwoofer channel to the subwoofer loudspeaker 132. If control information is included with the audio signals and is associated with the subwoofer channel, the subwoofer loudspeaker 132 utilizes the control information to manipulate the subwoofer channel. For example, the subwoofer loudspeaker could adjust the volume level of the broadcast signal.

The wireless receiver 502 further provides the received rear-left and rear-right channels to the subwoofer loudspeaker 132 for amplification. If control information is included with the audio signals and is associated with the rear-left or rear-right channels, the subwoofer loudspeaker 132 utilizes the control information to manipulate the associated channel. As described above, a separate amplifier from the subwoofer loudspeaker 132 may be employed to amplify the rear-left and rear-right channels.

The amplifiers in the subwoofer drive the rear-right loudspeaker 138 and the rear-left loudspeaker 144 by sending the received rear-right loudspeaker signal via wire 136 and by sending the received rear-left loudspeaker signal via wire 142, respectively. The rear-right loudspeaker 138 broadcasts the rear-right loudspeaker signal. The rear-left loudspeaker 144 broadcasts the rear-left loudspeaker signal.

Figure 2:
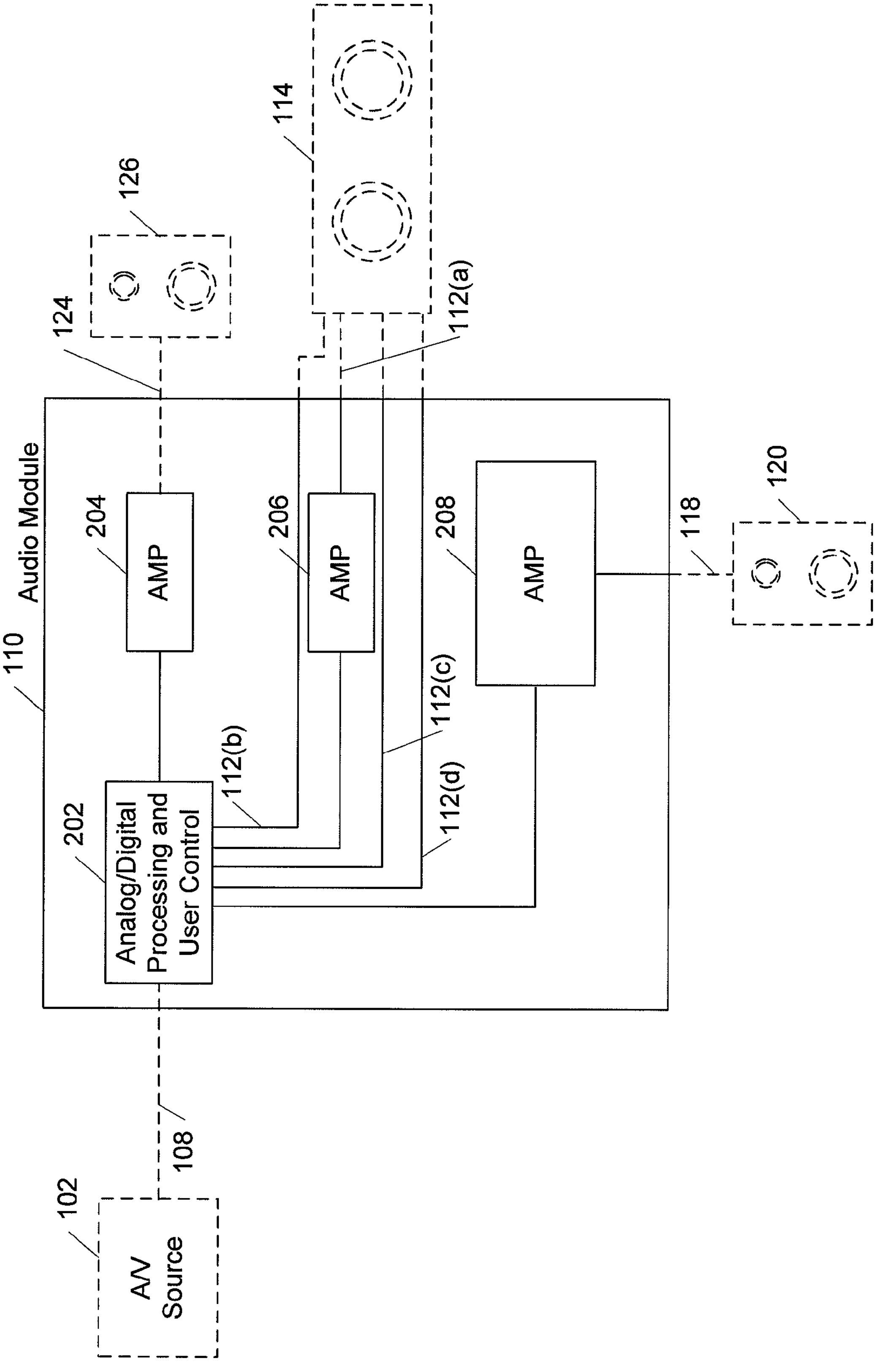
FIG. 2 is a block diagram of an audio module shown in FIG. 1C, which includes a digital sound processing module for extracting a plurality of channels from an audio signal.

FIG. 2 is a block diagram of an audio module 110 shown in FIG. 1C, which includes a digital sound processing (DSP) module or decoder 202 and one or more amplifiers 204, 206, 208. The DSP module 202 extracts a plurality of channels from the audio signal 108 received from the input source 102. Depending on the channel format available from the input source 102, the DSP module 202 processes the audio signal into the selected channel configuration, such as Dolby Digital, DTS, SRS or other. The DSP may further process control information such as equalizer information, volume or other signal processing information.

In the exemplary home theater system 100 illustrated in FIGS. 1C and 2, the DSP module 202 extracts six audio channels from the audio signal 108. The DSP module 202 can further create or derive additional audio channels or virtual channels from the discrete audio channels depending on the surround sound format. Discrete audio channels are unique channels with respect to the other channels received from the same input source 102. Virtual or derived audio channels are created from the discrete audio channels. An exemplary virtual surround sound format is Sound Retrieval System (SRS). SRS make use of only a left channel and a right channel to create an acoustic effect which emulates a surround sound format.

Depending on the surround sound format desired, a corresponding number of loudspeakers and channels of amplification may be employed. Preferably, amplification of audio channels destined for loudspeakers located near the front of the listening area is performed by the audio module 110. Such an arrangement prevents routing speaker wires across the listening area.

Preferably, the subwoofer loudspeaker 132 performs amplification of audio channels destined for loudspeakers located near the back of the listening area. Since the subwoofer loudspeaker 132 requires a power cord for amplification of the subwoofer channel, the addition of amplifiers to the subwoofer loudspeaker 132 for the rear-left and rear-right channels allows the rear-left and rear-right loudspeakers 144, 138 to be placed in the listening area away from power plugs. In this way, the rear-left and rear-right loudspeakers 144, 138 do not require internal amplification.

The rear-right and rear-left loudspeakers 144, 138 are connected to the subwoofer loudspeaker 132 via wires 142, 136. By not locating a wireless receiver proximate to the rear-left and rear-right loudspeakers 144, 138, the rear-left and rear-right loudspeakers are not required to be specialized loudspeakers. Thus, a listener can incorporate their non-specialized, existing rear-left and rear-right loudspeakers 144, 138 into the home theater system 100.

In the embodiment illustrated in FIG. 2, the audio module 110 amplifies signals for the front-left loudspeaker 120, the front-right loudspeaker 126, and the center channel loudspeaker 114. As illustrated in FIG. 2, separate amplifiers 204, 206, 208 are employed for each audio channel. Alternatively, a single amplifier can be employed for the three channels. One or more of the amplifiers 204, 206, 208 can be a digital amplifier or an analog amplifier. Digital amplifiers internally process the audio signal in the digital domain.

The amplifier 204 amplifies the front-right loudspeaker signal received from the DSP module 202. The amplified signal 124 drives the front-right loudspeaker 126. The amplifier 208 amplifies the front-left loudspeaker signal received from the DSP module 202. The amplified signal 118 drives the front-left loudspeaker 120. The amplifier 206 amplifies the center channel loudspeaker signal received from the DSP module 202. The amplified signal 112(*a*) drives the center channel loudspeaker 114. The audio module 110 provides the rear-right signal 112(*b*), the rear-left signal 112(*c*), and the subwoofer signal 112(*d*) to the wireless transmitter 302 for their wireless transmission to the subwoofer loudspeaker 132.

Figure 3:
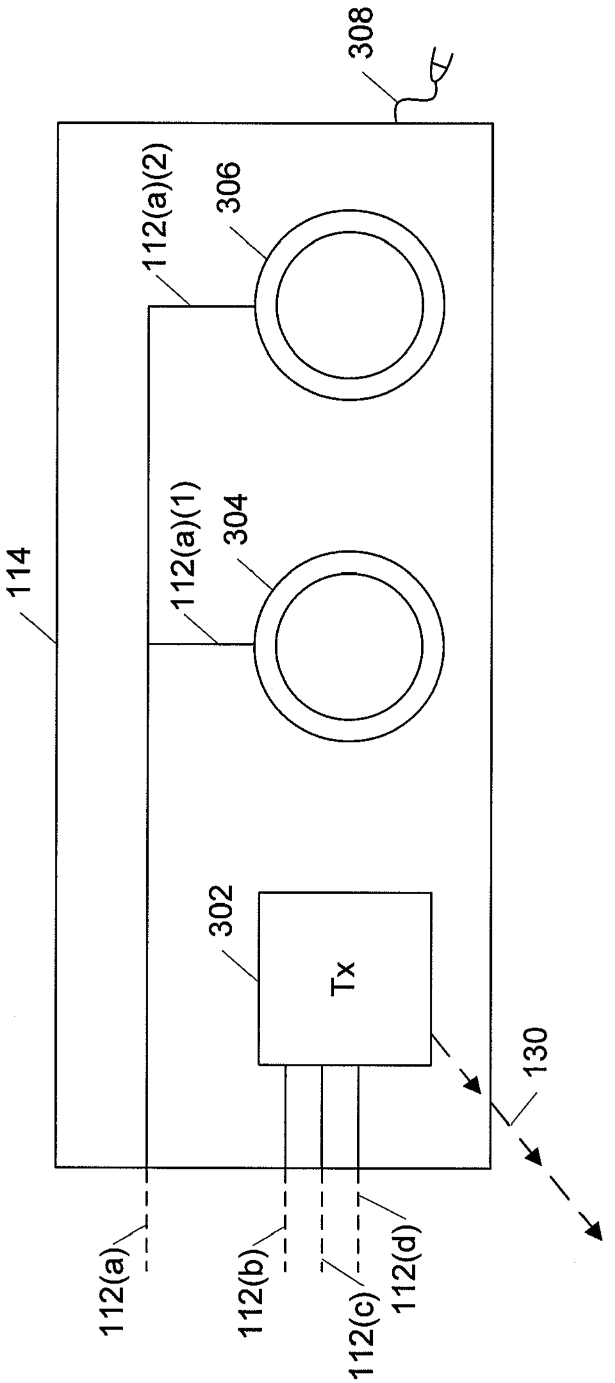
FIG. 3 is a block diagram of the center channel loudspeaker shown in FIG. 1C, which includes a wireless transmitter for transmitting the plurality of channels to the subwoofer loudspeaker.

FIG. 3 is a block diagram of the center channel loudspeaker 114 shown in FIG. 1C, which includes a wireless transmitter 302 for transmitting the rear-right signal 112(*b*), the rear-left signal 112(*c*), and the subwoofer signal 112(*d*) to the subwoofer loudspeaker 132. The signals are transmitted via signal path 130. The wireless transmitter 302 is described in detail with reference to FIG. 4A.

The center channel loudspeaker 114 further comprises driver or drivers or output devices 304, 306 and power cord 308. The one or more output devices 304, 306 broadcast the center channel signal 112(*a*) to the listener. The output devices 304, 306 change the audio signal into sounds loud enough to be heard at a selected distance or volume level. The drivers or output devices 304, 306 receive the center channel speaker signal via lines 112(*a*)(1), 112(*a*)(2), respectively. The power cord 308 interfaces with a common household electrical outlet to provide electricity to the wireless transmitter 302. In another embodiment the transmitter may derive its power from the amplified or audio input signals, thus requiring no ac adapter. Additional embodiments of a center channel loudspeaker in combination with one or more front loudspeakers and/or one or more input devices are described in co-pending U.S. patent express mail number EV370472645US, filed Feb. 24, 2004, and titled System and Method for Mounting of Audio-Visual Components, which is hereby incorporated by reference in its entirety.

Figure 4A:
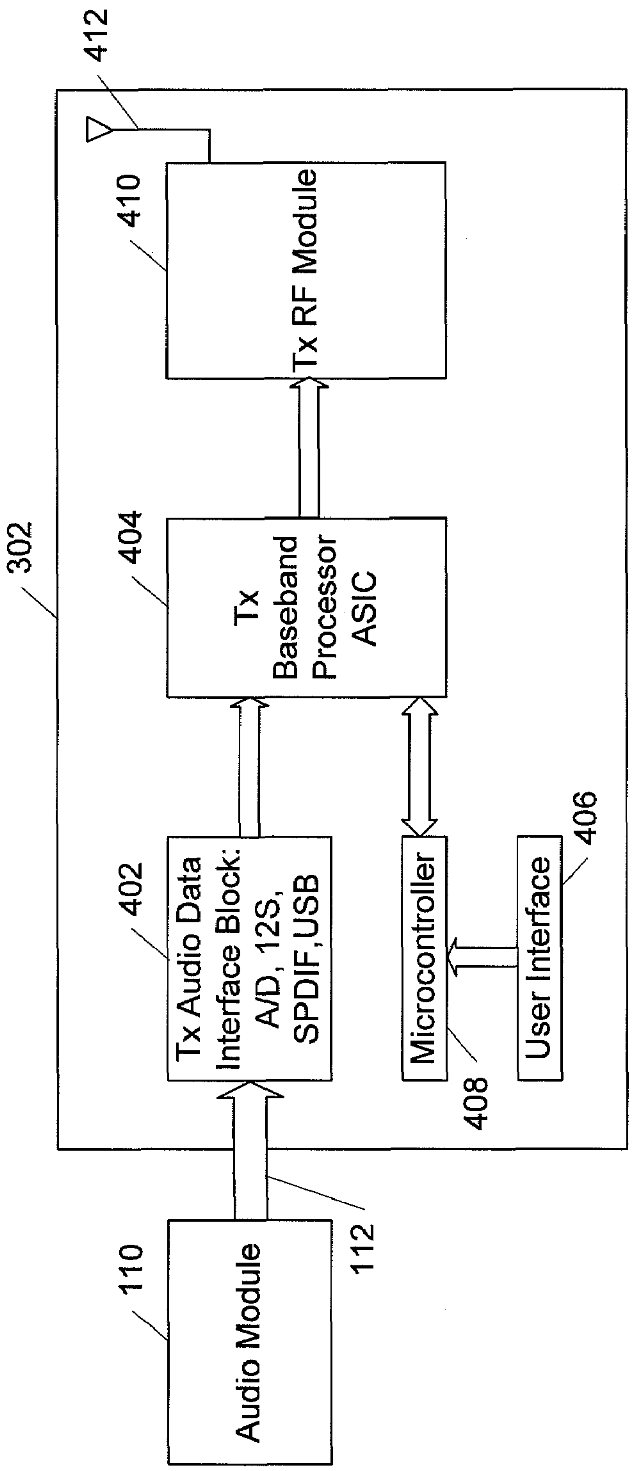
FIG. 4A is a block diagram of the wireless transmitter shown in FIG. 3.

FIG. 4A is a block diagram of the wireless transmitter 302 shown in FIG. 3. The wireless transmitter 302 comprises an audio data interface module 402, a baseband processor 404, and an RF module 410. The wireless transmitter can further include a microcontroller 408 and a user interface 406 for allowing a user to configure the microcontroller 408. The wireless transmitter 302 receives the audio signal from the audio module 110. The audio module 110 and the audio data interface module 402 can interface together via a wired connection 112. For example, RCA, inter IC sound ($I^2S$), SPDIF, Ethernet, 1394, USB and other connectors could be used. If the audio signal is received in an analog format, an analog to digital converter converts the analog audio signal to a digital format.

The wireless transmitter 302 can combine the audio signal with one or more control signals received from the audio module 110. As mentioned above, an exemplary control signal is a desired volume level. The control signal can originate at the audio module 110 or the wireless transmitter 302 via the microcontroller 408. The audio interface module 402 converts the audio signal from its original format to a format required by the baseband processor 404. The baseband processor 404 processes the formatted data and feeds the data to the RF module 410. The RF module 410 modulates and transmits over the air through an antenna 412 along signal path 130.

The microcontroller 408 can control the RF channel switching, setting transmit/receive pair identification (ID), and issuing remote control commands to the wireless receiver 502. These commands can include, for example, volume control. The transmit/receive pair ID allows multiple transmitter/receiver pairs to work simultaneously. In one exemplary embodiment, there are a total of sixteen different IDs. The user interface 406 accepts user input such as RF channel switching, volume control etc.

Figure 4B:
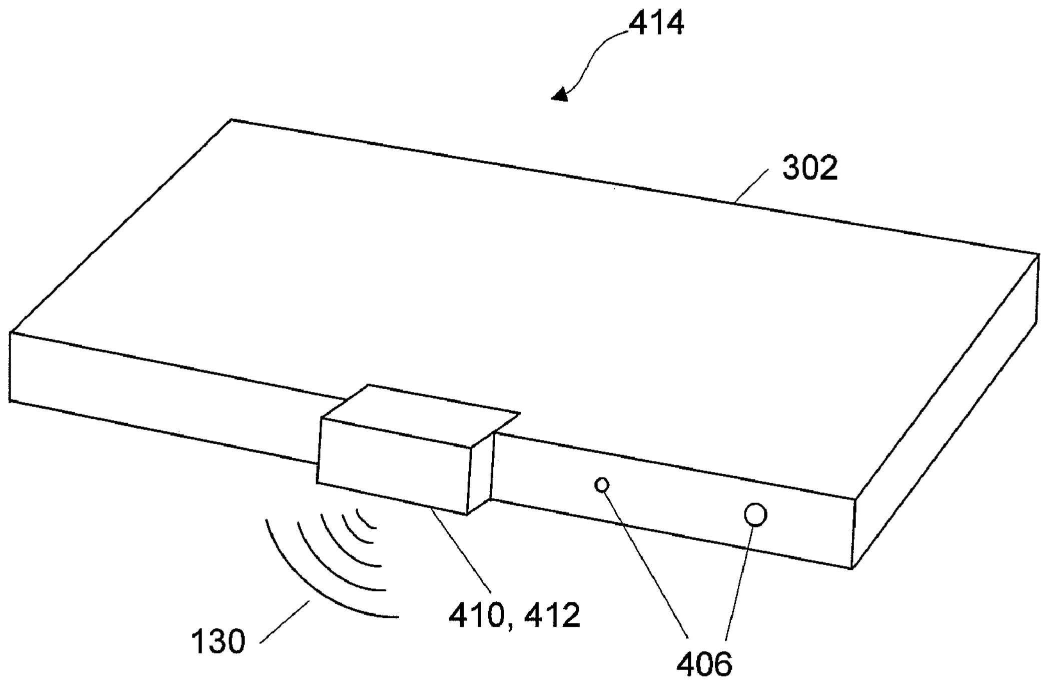
FIG. 4B is an embodiment of a housing for the wireless transmitter illustrated in FIG. 4A.

FIG. 4B is an embodiment of a housing 414 for the wireless transmitter 302 illustrated in FIG. 4A. As illustrated, the housing includes, among other components illustrated in FIG. 4A, a Tx RF Module 410 and associated antenna 412 for transmitting the wireless channels. The antenna 412 transmits the channel signals along signal path 130 to the wireless receiver 502. The user interface 406 illustrated in FIG. 4B comprises a channel selector for RF channel switching and a power button. Channel or power switching may also be accomplished via remote control. As described with reference to FIG. 4A, the user interface 406 can allow a user to, for example, select transmit/receive pair identification (ID) and issue remote control commands to the wireless receiver 502.

Figure 4C:
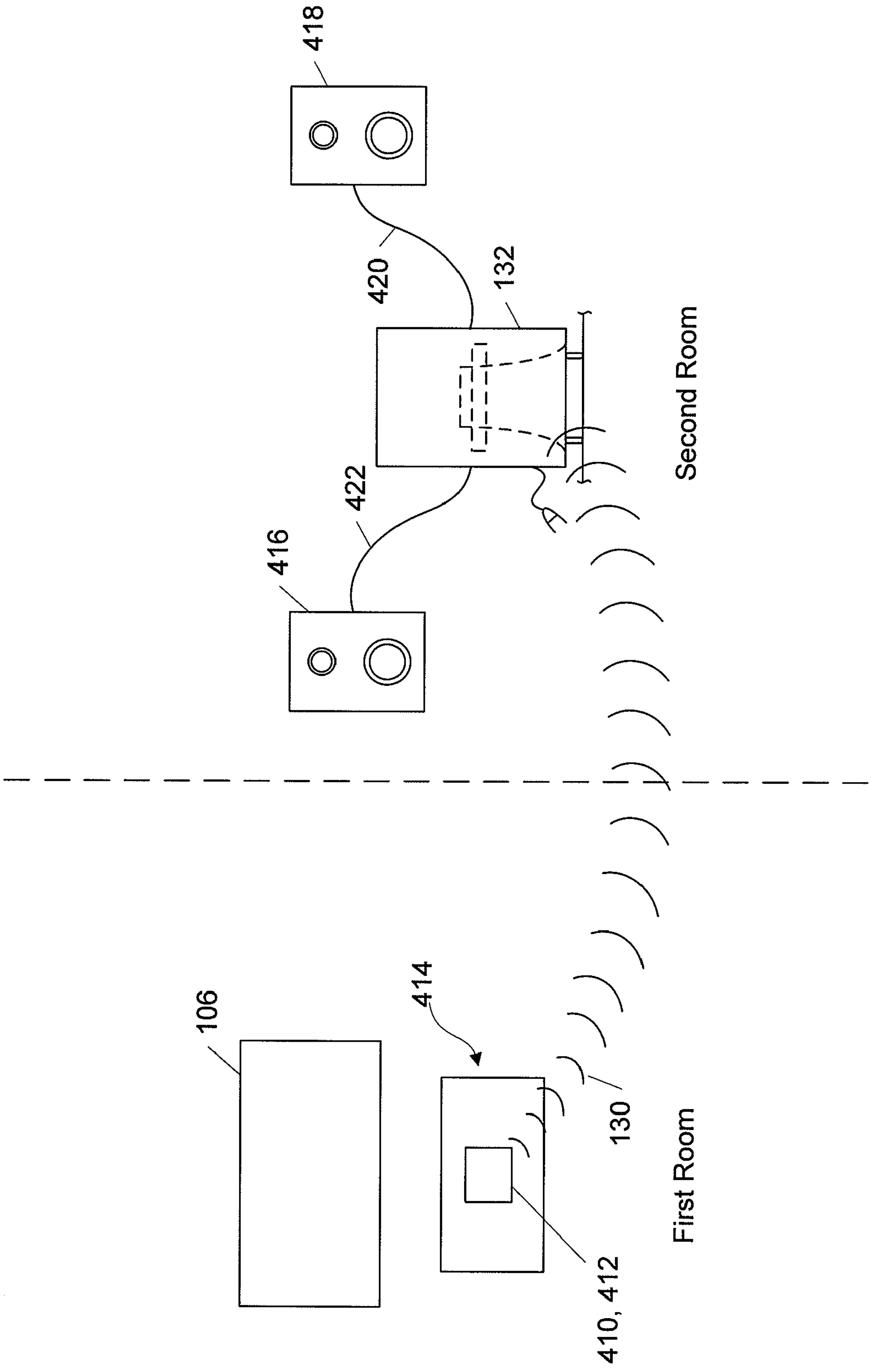
FIG. 4C is a block diagram of a multi-room theater system which includes a housing for the wireless transmitter illustrated in FIG. 4A which wirelessly transmits a plurality of channels from a first room and to a subwoofer loudspeaker located in a second room.

FIG. 4C is a block diagram of a of a multi-room theater system which includes a housing 414 for a wireless transmitter 302 illustrated in FIG. 4A. The wireless transmitter 302 transmits a plurality of channels from a first room and to a subwoofer loudspeaker 132 located in a second room. The Tx RF Module 410 and associated antenna 412 transmit the wireless channels along signal path 130 to a wireless receiver 502 associated with the subwoofer loudspeaker 132. The transmitted signal can include audio channels destined for the subwoofer, left, and right loudspeakers 132, 416, 418 along with any control information that is associated with the transmitted audio channels. Together, the audio channels and any control information can form a combined signal.

In the embodiment illustrated in FIG. 4C, the transmitter 302 within the housing 414 employs a wireless protocol to transmit the combined signal to the wireless receiver 502. For example, the transmitter 302 could transmit the combined signal via radio frequency (RF), IR, powerline or other wireless technique to the wireless receiver 502. The illustrated embodiment of the multi-room theater system is configured to utilize a radio frequency (RF) transmission protocol. However, the following description equally applies to multi-room theater systems that use techniques other than RF, for example the transmission maybe done over powerline. By wirelessly transmitting the audio signal between the first room and second room, the listener is able to listen to the audio signals in the second room without running speaker wires between the two rooms.

The wireless receiver 502 associated with the subwoofer loudspeaker 132 receives the transmitted audio channels and any control information transmitted along path 130. The wireless receiver 502 provides the received subwoofer channel to the subwoofer loudspeaker 132. If control information is included with the audio signals and is associated with the subwoofer channel, the subwoofer loudspeaker 132 utilizes the control information to manipulate the subwoofer channel. For example, the subwoofer loudspeaker could adjust the volume level of the broadcast signal.

The wireless receiver 502 further provides the received left and right channels to the subwoofer loudspeaker 132 for amplification. If control information is included with the audio signals and is associated with the left or right channels, the subwoofer loudspeaker 132 utilizes the control information to manipulate the associated channel. A separate amplifier from the subwoofer loudspeaker 132 may be employed to amplify the left and right channels.

The amplifiers in the subwoofer drive the right loudspeaker 418 and the left loudspeaker 416 by sending the received right loudspeaker signal via wire 420 and by sending the received left loudspeaker signal via wire 422, respectively. The right loudspeaker 418 broadcasts the right loudspeaker signal. The left loudspeaker 416 broadcasts the left loudspeaker signal. The multi-room theater system can further comprise a TV, video display, or other display device 106 for displaying a video signal.

Figure 5:
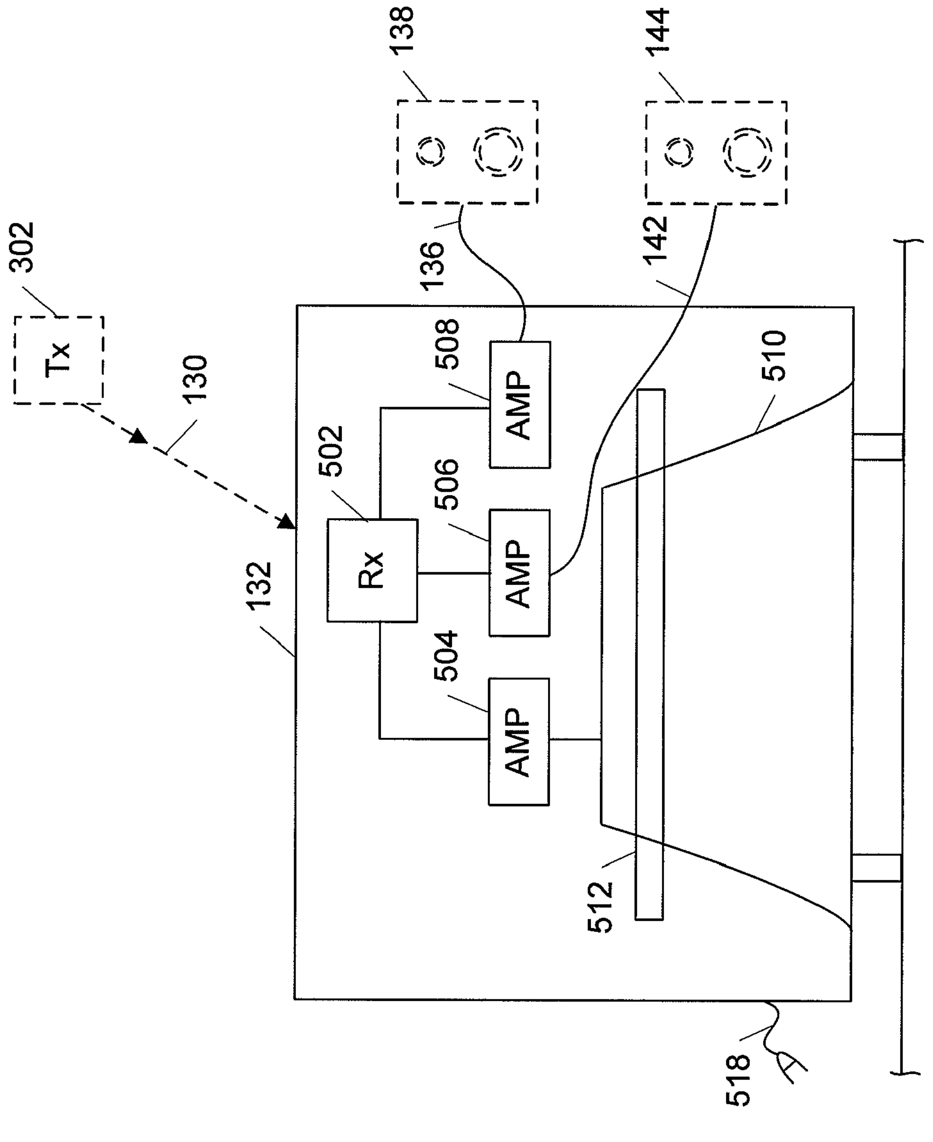
FIG. 5 is a block diagram of the subwoofer loudspeaker from FIG. 1C, which includes a wireless receiver for receiving the plurality of channels transmitted by the center channel speaker and provides at least one of the plurality of channels to a remote loudspeaker.

FIG. 5 is a block diagram of the subwoofer loudspeaker 132 from FIG. 1C, which includes a wireless receiver 502 for receiving the rear-right signal 112(*b*), the rear-left signal 112(*c*), and the subwoofer signal 112(*d*) transmitted by the wireless transmitter 302. The subwoofer loudspeaker 132 further comprises an output device 510, magnet 512 and amplifiers 504, 506, 508. The wireless receiver 502 may further process control information such as equalizer information, volume or other signal processing information received from the wireless transmitter 302.

In the embodiment illustrated in FIG. 5, the subwoofer loudspeaker 132 amplifies signals for the rear-left loudspeaker 144, the rear-right loudspeaker 138, and the subwoofer loudspeaker 132. The amplifier 504 amplifies the subwoofer loudspeaker signal 112(*d*) received from the wireless transmitter 502. The amplified signal drives the output device 510. The amplifier 506 amplifies the rear-left loudspeaker signal 112(*c*) received from the wireless receiver 502. The amplified signal drives the rear-left loudspeaker 144. The amplifier 508 amplifies the rear-right loudspeaker signal 112(*b*) received from the wireless receiver 502. The amplified signal drives the rear-right loudspeaker 138.

The output device 510 broadcasts the LFE or subwoofer signal 112(*d*) to the listener. Due to the high power requirements to reproduce low frequency effects, amplification of the subwoofer channel is performed separately from amplification of the rear left and right loudspeakers 138, 144. However, such an arrangement is not required to practice the invention.

Figure 6:
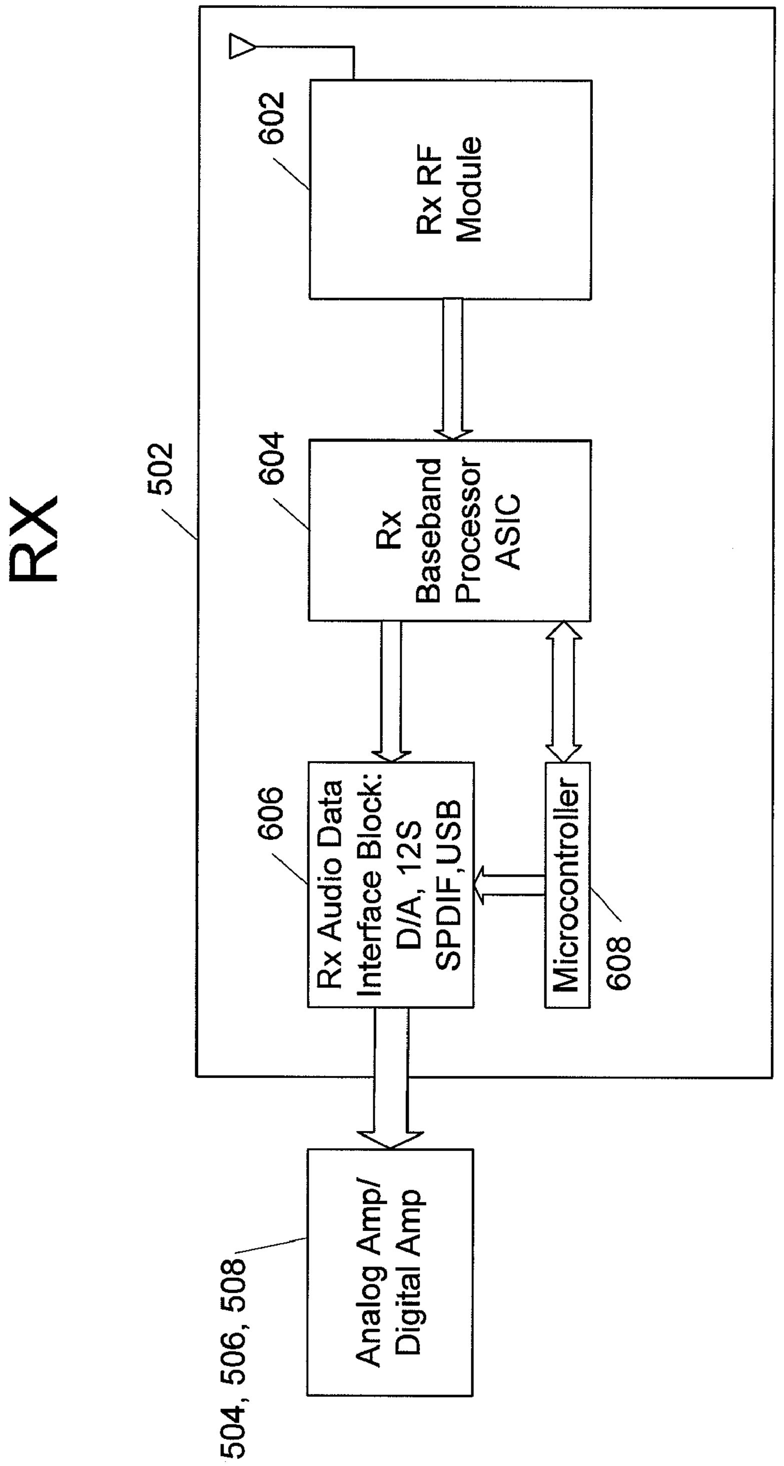
FIG. 6 is a block diagram of the wireless receiver shown in FIG. 5.

FIG. 6 is a block diagram of the wireless receiver 502 shown in FIG. 5. The wireless receiver 502 comprises an audio data interface module 606, a baseband processor 604, and an RF module 602. The wireless receiver 502 can further include a microcontroller 608. The RF module 602 receives the audio signal via an antenna and demodulates the received audio signal to a baseband signal. The baseband processor 604 extracts the audio channel data from the baseband signal. The audio data interface module 606 converts the extracted audio channel data to either digital format or analog format depending on the type of amplification employed. If digital amplification is utilized, the audio data interface module 606 provides a digital signal to the amplifiers 504, 506, 508. If analog amplification is utilized, the audio data interface module 606 provides an analog signal to the amplifiers 504, 506, 508.

The microcontroller 608 synchronizes the auto RF channel which allows the wireless receiver 502 to follow the RF channel used by the wireless transmitter 302. The microcontroller 608 can decode the control information received from the wireless receiver 502, as well as auto mute if the baseband processor 604 detects strong RF interference.

Figure 7:
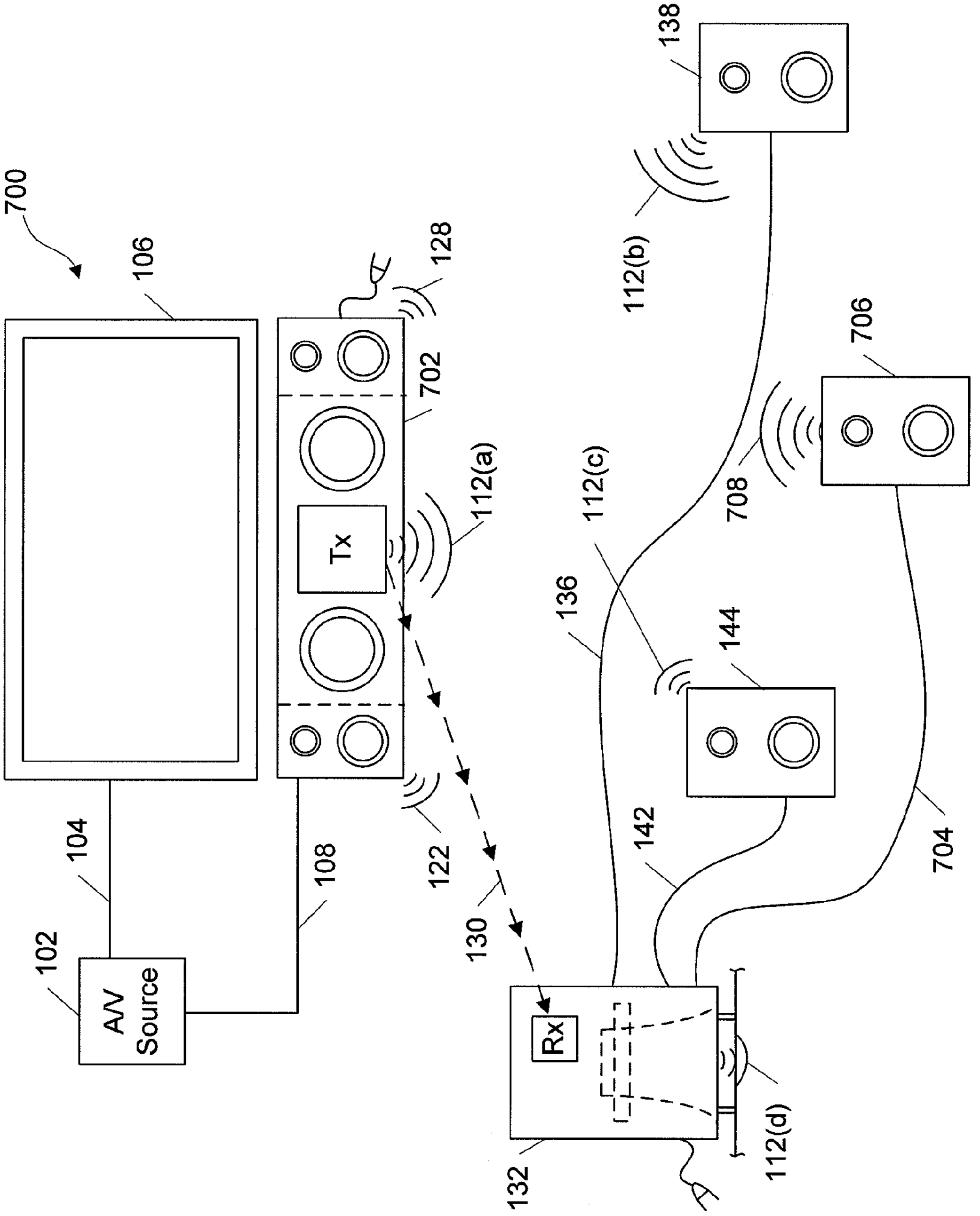
FIG. 7 is a second embodiment of a home theater system which co-locates the digital sound processing module from FIG. 2 with a center channel loudspeaker.
Figure 8:
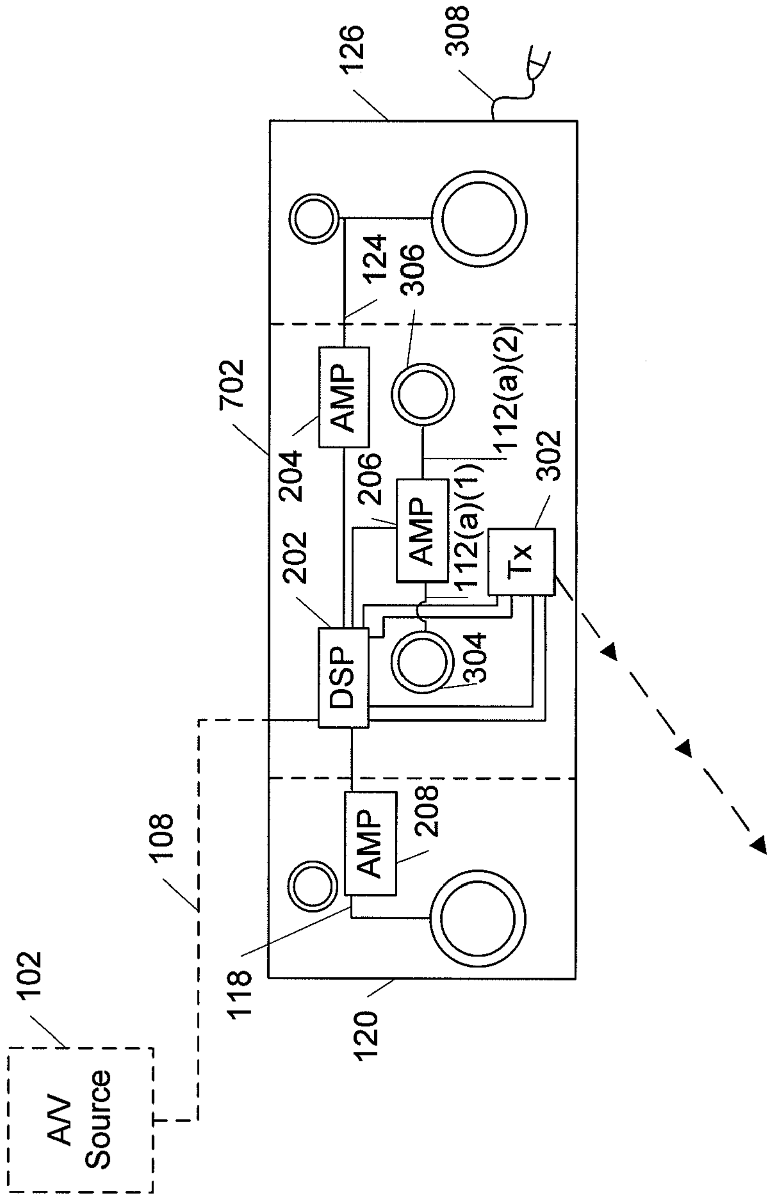
FIG. 8 is a block diagram of the center channel loudspeaker shown in FIG. 7, which includes the digital sound processing module from FIG. 2 and the wireless transmitter from FIG. 4A.

FIGS. 7 and 8 illustrate a second embodiment of a home theater system 700. The home theater system illustrated in FIGS. 7 and 8 is configured to broadcast a 6.1 audio signal. The descriptions of the components described with reference to FIG. 1C apply equally to the embodiment illustrated in FIGS. 7 and 8 except as noted. Like numerals refer to like elements. In the embodiment illustrated in FIGS. 7 and 8, the DSP module 202, which was located in the audio module 110 (see FIG. 1C), is co-located with the center channel loudspeaker 702. With the DSP module 202 located with the center channel loudspeaker 702, the identification of the audio channels in the audio signal 108 occurs in the center channel loudspeaker 702.

In addition to the rear-left loudspeaker 144 and the rear-right loudspeaker 138, the home theater system illustrated in FIGS. 7 and 8 comprises a rear center channel loudspeaker 706. Thus, in addition to transmitting the subwoofer, rear-left, and rear-right channels to the wireless receiver 502, the wireless transmitter 302 transmits a rear center channel. In the illustrated embodiment, the subwoofer loudspeaker 132 is configured to receive the channel signals. Alternatively, one of the other loudspeakers located in the rear of the listening area receives the channel signals. For example, the rear center channel loudspeaker 706 could include the wireless receiver 502 and/or amplifier(s). In these additional embodiments, the receiving loudspeaker routes the channel signals to the other loudspeakers located in the rear of the listening area.

Returning to the illustrated embodiment, the subwoofer loudspeaker 132 includes an amplifier that drives the rear-center channel loudspeaker 706 via wire 704. As with the embodiment described with reference to FIG. 1C, the home entertainment system 700 allows the listener to employ non-specialized rear-right, rear-left, and rear-center loudspeakers 138, 144, 706 while not running speaker wires between the front and back of the listening area. As illustrated in FIG. 7, speaker wires do not cross the center of the listening area. The rear-center channel loudspeaker 706 broadcasts the rear-center channel signal 708 of the 6.1 audio signal.

An additional variation between the home theater system illustrated in FIG. 1C and the home theater system illustrated in FIGS. 7 and 8 is the center channel loudspeaker 702, the left-front loudspeaker 120, and the right-front loudspeaker 126 share a common housing. This arrangement allows the listener to locate a single housing that comprises all of the loudspeakers at the front of the listening area rather than locating three different loudspeaker housings.

Figure 10:
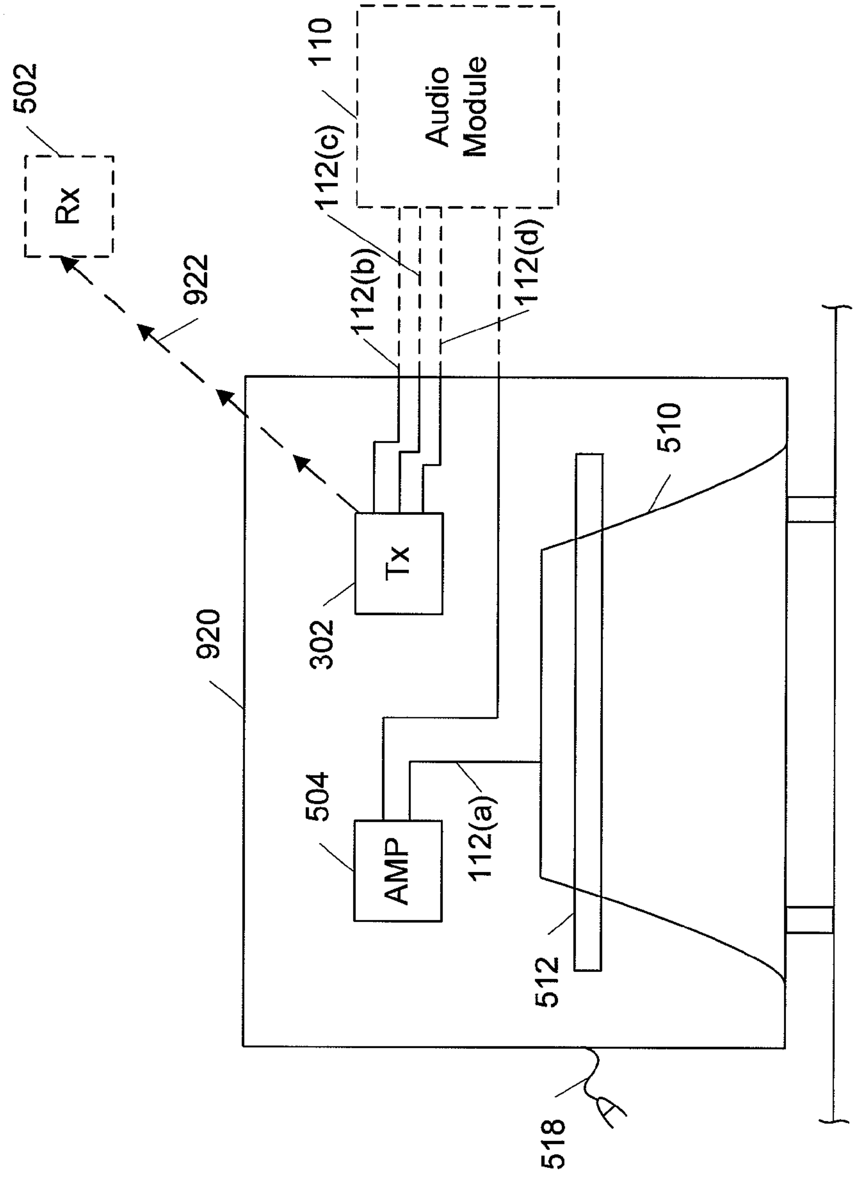
FIG. 10 is a block diagram of the subwoofer loudspeaker from FIG. 9, which includes a wireless transmitter for transmitting the plurality of channels to the center channel loudspeaker.
Figure 11:
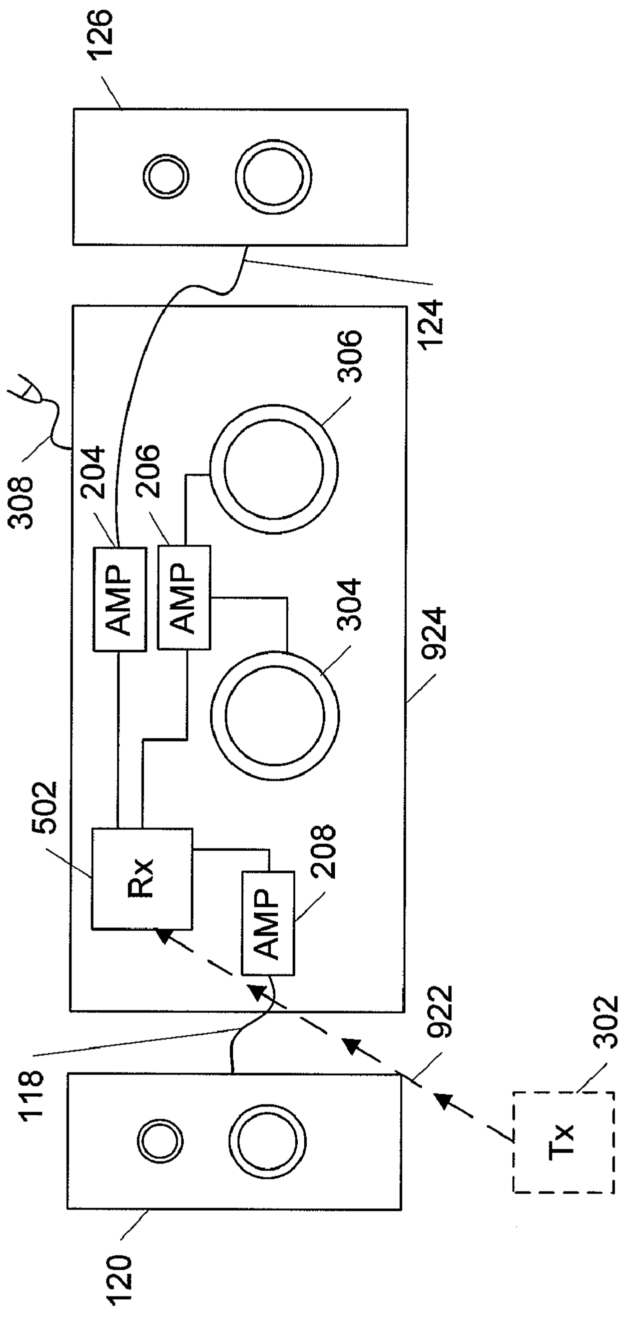
FIG. 11 is a block diagram of the center channel loudspeaker shown in FIG. 9, which includes a wireless receiver for receiving the plurality of channels transmitted by the subwoofer loudspeaker.

FIGS. 9-11 illustrate a third embodiment of a home theater system 900 which includes a wireless transmitter 302 in the subwoofer loudspeaker 920 for transmitting audio channels to a wireless receiver 502 in the center channel loudspeaker 924. The home theater system illustrated in FIGS. 9-11 is configured to broadcast 7.1 audio signals and may also broadcast a video signal. In other embodiments the number of channels may be fewer or more than what is illustrated. For example the same system could be 2.1, 5.1, 6.1 or other.

A video projector 902 is located at the rear of the listening area and displays a video signal 104 on a screen 904. Alternatively, the video signal is wirelessly transmitted across the listening area to a video display 106 or associated wireless receiver located near the front of the listening area. In one embodiment, the subwoofer loudspeaker 920 transmits the video signal to the front of the listening area. An exemplary video display was described in connection with FIG. 1A.

The descriptions of the components described with reference to FIG. 1C apply equally to the embodiment illustrated in FIGS. 9-11 except as noted. Like numerals refer to like elements. In the embodiment illustrated in FIGS. 9-11, the wireless transmitter 302 and the wireless receiver 502 from FIG. 1C switch their locations. The wireless transmitter 302, which was located in the center channel loudspeaker 114 (see FIG. 1C), is located within a subwoofer loudspeaker 920 (see FIG. 10). The wireless receiver 502, which was located in the subwoofer loudspeaker 132 (see FIG. 1C), is located within a center channel loudspeaker 924 (see FIG. 11). As described above, the transmitter and/or receiver are not required to be located within the referenced loudspeakers but may be located proximate to the loudspeakers.

In addition to the rear-left loudspeaker 144 and the rear-right loudspeaker 138, the home theater system illustrated in FIGS. 9-11 comprises a pair of additional surround channel loudspeakers 912, 910. The audio module 110 drives the additional surround channel loudspeakers 910, 912 via wires 908 and 914, respectively. The additional surround channel loudspeakers 910, 912 broadcast the additional surround channel signals 918 and 919 of the 7.1 audio signal. In other embodiments the number of channels maybe fewer or more than what is illustrated. For example the same system could be 2.1, 5.1, 6.1 or other.

Figure 12:
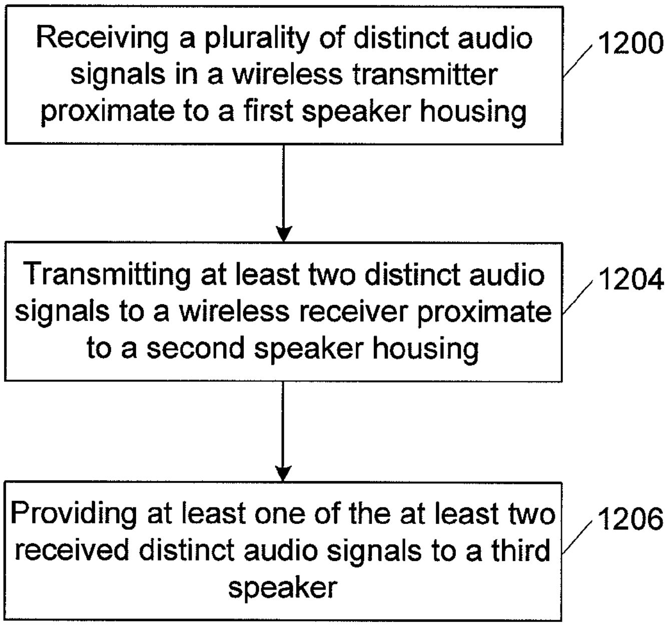
FIG. 12 is a flowchart of an exemplary process that is performed by the home theater systems illustrated in FIGS. 1C, 7, and 9.

FIG. 12 is a flowchart of an exemplary process that is performed by the home theater systems illustrated in FIGS. 1C, 7, and 9. The process begins at a state 1200 where a wireless transmitter 302 receives an audio signal from the audio module 110. Alternatively, the wireless transmitter 302 receives the audio signal directly from the input device 102. The audio signal comprises a plurality of audio channels. The wireless transmitter 302 is located proximate to a housing for a first loudspeaker. For example, the first loudspeaker can be a center channel loudspeaker or a subwoofer loudspeaker depending on the configuration of the listening area and the location of the input device 102.

The process moves to a state 1204 where the wireless transmitter 302 transmits at least two of the audio signals to a wireless receiver located proximate to a second speaker housing. The signal may further include control information. The second loudspeaker can be, for example, a subwoofer loudspeaker or a center channel loudspeaker depending on the configuration of the listening area and the location of the input device 102. If the first loudspeaker is a center channel loudspeaker, the second loudspeaker is a sub-woofer loudspeaker. Similarly, if the first loudspeaker is a subwoofer loudspeaker, the second loudspeaker is a center channel loudspeaker. If control information is included with the signal, the wireless receiver can manipulate one or more of the audio channel based on the control signal.

Next, at a state 1206, at least one of the two received audio channels is provided to a third loudspeaker in a separate housing from the second loudspeaker. The third loudspeaker can be, for example, a front-right loudspeaker, a front-left loudspeaker, a rear-right loudspeaker, a rear-right loudspeaker or other surround loudspeaker. The third loudspeaker broadcasts the audio channel to the listener.

The foregoing description details certain preferred embodiments of the present invention and describes the best mode contemplated. It will be appreciated, however, that no matter how detailed the foregoing appears in text, the invention can be practiced in many ways. The embodiments of the transmitters/receivers herein disclosed can be fixed or modular in design. For example, a digital or common bus can be used. Examples of common bus designs include $I^2S$, $I^2C$, parallel, and serial.

As is also stated above, it should be noted that the use of particular terminology when describing certain features or aspects of the present invention should not be taken to imply that the terminology is being re-defined herein to be restricted to including any specific characteristics of the features or aspects of the invention with which that terminology is associated. The scope of the present invention should therefore be construed in accordance with the appended claims and any equivalents thereof.

What is claimed is:

1. An entertainment system comprising:

a speaker housing having a loudspeaker, wherein the loudspeaker is configured to broadcast a first channel of an audio signal;

a transmitter located proximate to the speaker in a first selected area of a room and configured to wirelessly transmit a plurality of channels of the audio signal, wherein the plurality of channels is different than the first channel;

a receiver located remote from the transmitter in a second selected area of the room, wherein the receiver is configured to wirelessly receive the plurality of channels; and a second speaker housing located proximate to the receiver and having a second loudspeaker and an amplifier, wherein the amplifier is configured to amplify at least two of the received channels, and wherein the second loudspeaker is configured to broadcast one of the amplified channels and route the other amplified channel to a third speaker housing.

2. The entertainment system of claim 1, wherein the first and second selected areas correspond to a pair of speaker locations.

3. The entertainment system of claim 1, wherein the loudspeaker is a center channel loudspeaker.

4. The entertainment system of claim 3, wherein the center channel loudspeaker comprises a digital sound processor.

5. The entertainment system of claim 3, further comprising an audio module configured to provide the first channel and the plurality of channels to the center channel loudspeaker.

6. The entertainment system of claim 5, wherein the audio module comprises a digital sound processor.

7. The entertainment system of claim 1, wherein the loudspeaker is a subwoofer loudspeaker.

8. The entertainment system of claim 1, wherein the loudspeaker is a center rear loudspeaker.

9. The entertainment system of claim 8, wherein the center rear loudspeaker is configured to transmit a video signal that is associated with the audio signal.

10. The entertainment system of claim 7, wherein the subwoofer loudspeaker is configured to transmit a video signal that is associated with the audio signal.

11. The entertainment system of claim 7, wherein the subwoofer loudspeaker comprises a digital sound processor.

12. The entertainment system of claim 7, further comprising an audio module configured to provide the first channel and the plurality of channels to the subwoofer loudspeaker.

13. The entertainment system of claim 12, wherein the audio module comprises a digital sound processor.

14. The entertainment system of claim 1, wherein the second speaker routes the other amplified channel to the third speaker housing using a wired connection.

15. The entertainment system of claim 1, wherein the first and second selected areas are located at opposite ends of a listening area.

16. A housing comprising:

a wireless receiver configured to receive a plurality of channels;

an amplifier configured to amplify at least three of the plurality of received channels; and a loudspeaker configured to broadcast one of the at least three amplified channels and output at least two of the at least three amplified channels, wherein the plurality of channels are received from a second loudspeaker.

17. The housing of claim 16, wherein the amplifier comprises three amplifiers, each amplifier being configured to amplify one of the three amplified channels.

18. The housing of claim 16, wherein the loudspeaker broadcasts a low frequency effects channel.

19. The housing of claim 16, wherein the loudspeaker broadcasts a full frequency effects channel.

20. An entertainment system configured to receive an audio signal from an input device and provide the audio signal to a plurality of remote loudspeaker, the system comprising:

a center channel loudspeaker comprising a transmitter module configured to receive an audio signal and transmit the audio signal to a remote loudspeaker, wherein the audio signal includes a plurality of different channels; and a remote loudspeaker having a receiver configured to receive the audio signal and distribute at least one of the received audio channels to a surround loudspeaker.

21. The system of claim 20, wherein the transmitter combines the audio signal with a control signal to form a combined signal, and transmits the combined signal to the remote loudspeaker; and wherein the receiver is configured to receive the combined signal from the transmitter and extract the control signal and the audio signal from the combined signal.

22. The system of claim 21, further comprising a microcontroller configured to manipulate the audio signal based on the extracted control signal.

23. The system of claim 21, further comprising a digital amplifier configured to digitally amplify the audio signal.

24. The system of claim 21, wherein the combined signal includes an address signal which is associated with the surround loudspeaker.

25. The system of claim 21, wherein the network is wired.

26. The system of claim 25, wherein the network is powerline.

27. The system of claim 21, wherein the network is wireless.

28. The system of claim 27, wherein the network is RF.

29. The system of claim 27, wherein the network is IR.

30. The system of claim 22, wherein the remote loudspeaker distributes the at least one of the received audio channels to the surround loudspeaker via a wire line.

31. The system of claim 22, further comprising an ac adapter configured to engage with an ac receptacle for providing power to the transmitter.

32. The system of claim 22, wherein the transmitter derives its power from the audio signal.

33. A multi-room entertainment system comprising:

a transmitter located in a first room and configured to wirelessly transmit a plurality of channels of an audio signal;

a receiver located in a second room, wherein the receiver is configured to wirelessly receive the plurality of channels; and a speaker housing located proximate to the receiver and having a loudspeaker and an amplifier, wherein the amplifier is configured to amplify at least two of the received channels, and wherein the loudspeaker is configured to broadcast one of the amplified channels and route the other amplified channel to a second loudspeaker housing.

* * * * *